United States Patent [19]

Demonte

[11] 3,860,909

[45] Jan. 14, 1975

[54] APPARATUS FOR RECOGNISING GRAPHIC SYMBOLS

[75] Inventor: Filippo Demonte, Borgofranco D'Ivrea, Italy

[73] Assignee: Ing. C. Olivetti & C., S.p.A., Ivrea (Turin), Italy

[22] Filed: Apr. 15, 1971

[21] Appl. No.: 134,129

[30] Foreign Application Priority Data

Apr. 16, 1970 Italy .................................. 68284/70

[52] U.S. Cl. ............. 340/146.3 AC, 340/146.3 AE, 340/146.3 J

[51] Int. Cl. ............................................. G06k 9/00

[58] Field of Search......... 340/146.3 AC, 146.3 AE, 340/146.3 J

[56] References Cited

UNITED STATES PATENTS

| | | | |
|---|---|---|---|
| 3,271,761 | 9/1966 | Hu | 340/146.3 AC |
| 3,274,551 | 9/1966 | Rohland | 340/146.3 AE |
| 3,293,604 | 12/1966 | Klein | 340/146.3 J |
| 3,609,685 | 9/1971 | Deutsch | 340/146.3 AE |

*Primary Examiner*—Gareth D. Shaw
*Assistant Examiner*—Robert F. Gnuse
*Attorney, Agent, or Firm*—Schuyler, Birch, Swindler, McKie & Beckett

[57] ABSTRACT

An apparatus for recognizing graphic symbols is disclosed, wherein a character is scanned by a cathode ray tube along a plurality of parallel scan lines (sections) and a photodetector supplies an analog electric signal proportional to the intensity of the light signal output from each scanned point. Each analog signal is preprocessed in order to obtain a digital signal. Each portion of this digital signal which corresponds to a white segment of a section is switched to one of a plurality of motif registers, according to the relationship of the white segment with the black segments of the same sections and with the shadow of the black segments of the sections already scanned. Each motif register is emptied if the motif is not separated, i.e., if the corresponding motif register does not receive at least a prefixed number of contributions. At the end of the scanning of the character, it is categorized according to the type of motifs present therein.

12 Claims, 21 Drawing Figures

PATENTED JAN 14 1975

3,860,909

SHEET 01 OF 13

INVENTOR.
FILIPPO DEMONTE

BY Birch, Swindler, McKie & Beckett
ATTORNEYS

INVENTOR.
FILIPPO DEMONTE

BY Birch, Swindler, McKie + Beckett
ATTORNEYS

INVENTOR.
FILIPPO DEMONTE
BY Birch, Swindler, McKie + Beckett
ATTORNEYS

INVENTOR.
FILIPPO DEMONTE
BY Birch, Swindler, McKie + Beckett
ATTORNEYS

INVENTOR.
FILIPPO DEMONTE

BY Birch, Swindler, McKie & Beckett
ATTORNEYS

PATENTED JAN 14 1975 3,860,909

SHEET 06 OF 13

INVENTOR.
FILIPPO DEMONTE

BY Birch, Swindler, McKie & Beckett
ATTORNEYS

INVENTOR.
FILIPPO DEMONTE

BY Birch, Swindler, McKie + Beckett
ATTORNEYS

INVENTOR.
FILIPPO DEMONTE

BY Birch, Swindler, McKie & Beckett
ATTORNEYS

INVENTOR.
FILIPPO DEMONTE
BY Birch, Swindler, McKie & Beckett
ATTORNEYS

INVENTOR.
FILIPPO DEMONTE
BY Birch, Swindler, McKie + Beckett
ATTORNEYS

INVENTOR.
FILIPPO DEMONTE
BY Birch, Swindler, McKie + Beckett
ATTORNEYS

INVENTOR.
FILIPPO DEMONTE
BY Birch, Swindler, McKie & Beckett
ATTORNEYS

INVENTOR
FILIPPO DEMONTE
BY Birch, Swindler, McKie & Beckett
ATTORNEYS

APPARATUS FOR RECOGNISING GRAPHIC SYMBOLS

The present invention concerns apparatus for recognising graphic symbols, of the type in which each symbol is scanned along substantially parallel tracks, referred to herein as sections, to derive a signal which is analysed to determine the symbol.

A criterion on which some known apparatuses of the type indicated operate consists in categorizing each symbol on the basis of the presence of motifs, that is of characteristic groups of points, having rigidly fixed forms and dimensions. This criterion is evidently applicable to graphic symbols whose shape is rigidly fixed, and in which irregularities of print are absent.

Other known apparatuses single out the presence of definite motifs in a flexible manner, and can therefore recognise graphic symbols whose shapes can vary over sufficiently wide limits. These apparatuses are, however, very complicated and costly and their operation is made critical by the presence of local irregularities, for example blots, in the symbols that are to be recognised.

According to the present invention there is provided apparatus for recognising graphic symbols, comprising means for exploring each symbol along a succession of substantially parallel sections to generate a signal representing for each section the succession of contrasting segments of first and second kinds, and logical circuits adapted, in each section, to examine the relationship of each segment of the first kind to the segments of the second kind and to the shadow, as hereinafter defined, of the segments of the second kind encountered in the sections already explored, and thereby to assign the segments of the first kind to motifs of different types, and categorizing means adapted to categorize each symbol as one of a group of symbols to be recognized in accordance with the combination of motifs present in the symbol.

An embodiment of the invention will now be described by way of example with reference to the accompanying drawings, in which.

Figure 1:
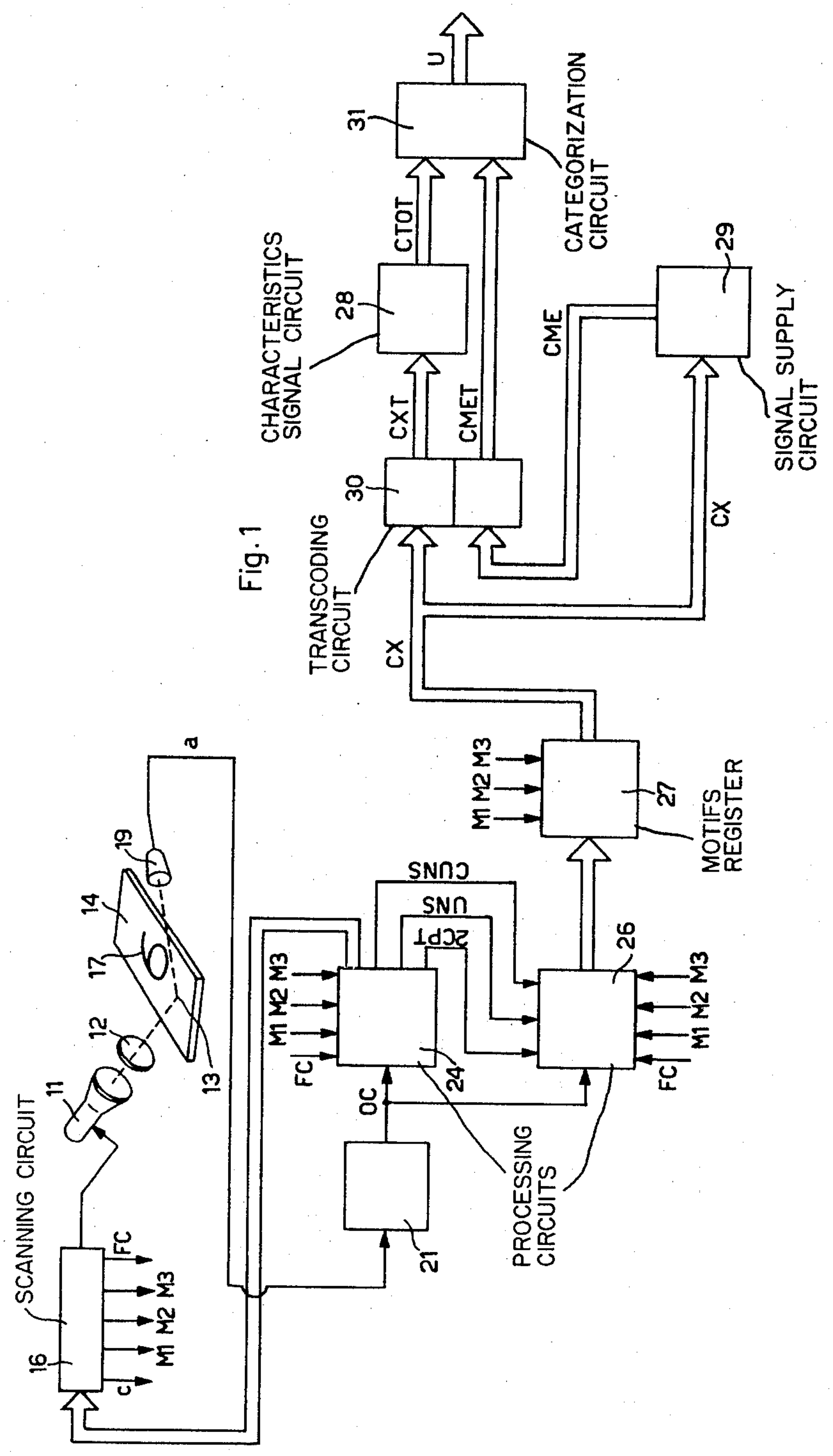
FIG. 1 shows a comprehensive block diagram of apparatus embodying the invention.
Figure 8:
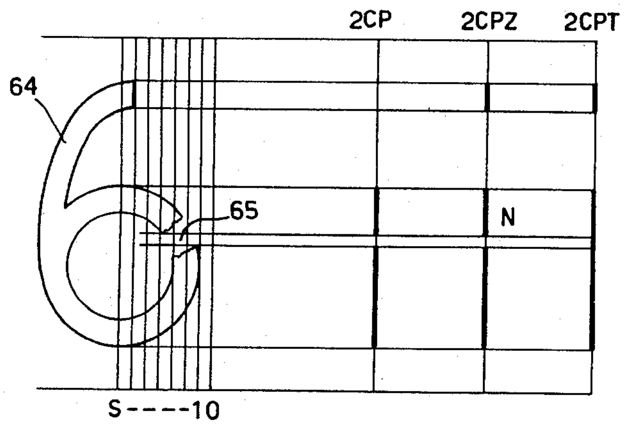
FIG. 8 shows through a numerical character the results of the processing of the black segments.

A cathode ray tube 11 (FIG. 1) directs, through a focusing system 12, a flying spot 13 on to a document 14 that is to be examined. The position of the spot is controlled by means of a scanning circuit 16, which works on a prefixed programme so as to examine each character 17 along parallel tracks, hereinafter referred to as sections, which proceed from top to bottom and from right to left (FIG. 8). The circuit 16 supplies a synchronising signal *c*, a sequence of end-of-section signals M1, M2, M3, and an end-of-character signal FC. The sequence M1, M2, M3 occurs at the end of every section.

The period of the signal *c* is a submultiple of the period of the signals M1, M2, M3. The light reflected by the document varies to a greater or lesser degree according to whether the flying spot encounters a light zone or a dark zone. The reflected light is collected by a photo-detector 19 which supplies an analog electric signal *a* substantially proportional to the intensity of the light input. The signal *a* goes to a preliminary processing circuit 21 which digitises it to binary form; the duration of each bit, and hence the duration of the successive "points" of scanning correspond to the period of the synchronizing signal *c*. The circuit 21 also corrects for irregularity of print density with a view to making easier the recognition of the characters on the part of the recognition circuits. The preliminary processing circuit 21 can for example be of the type described in our British Pat. application No. 61210/70. At the output from the preliminary processing circuit there is a signal OC representing the whole of the white and black segments of each scanning.

Some definitions and conventions are now introduced.

Segment. A black (white) segment is a group of black (white) adjacent points comprised in a section whose ends border on a white (black) segment or coincide with an edge of the section.

Belonging. Two segments *a*, *b* of two sections belong to each other if their projections on a line parallel to the scanning direction have points in common. If the signal corresponding to the segment *a* is stored in a register *k*, and *b* belongs to *a*, it is also said that *b* belongs to the register *k*. A segment *a* belongs completely to a segment *b* if the projection of *a* on *b* is comprised between the extremes of *b*.

Shadow. The shadow of a group of segments is the projection of all the segments of the group on to a line parallel to the scanning direction.

Blank segment. A blank segment is a white segment of a section *s* whose extremes (of the white segment) both border on black segments, and which completely belongs to the shadow of the group of black segments comprised in the sections from 1 to *s*-1.

Antiblank segment. An antiblank segment is a white segment of a section *s* whose extremes (of the white segment) both border on black segments, and which does not belong completely to the shadow of the group of black segments comprised in the sections from 1 to *s*-1.

Upper (lower) pseudo-blank segment. An upper (lower) pseudo-blank segment is a white segment of a section *s* whose upper (lower) extreme (of the segment) coincides with the upper (lower) extreme of the shadow of the group of black segments comprised in the sections from 1 to *s*-1 and whose lower (upper) extreme borders on a black segment, and such as to belong completely to the said shadow.

Motif. A motif is a group of segments of the same type belonging to an uninterrupted series of sections, such that all mutually belong, and such that in each section $s$ there is only one segment of the group and it belongs only to the segment of the whole of the section $s$-1 and to no other white segment of the same section.

Separation. A motif is called separated when, for at least $x$ adjacent scannings, its every segment belongs to the preceding one by at least $y$ points. A separated motif is a motif whose existence has been confirmed in this way.

Successor. A motif $m$ is called successor to a motif $n$ separated but not finished if the first segment of $m$ belongs to the last segment of $n$.

The recognition device embodying the invention recognises the characters according to the motifs present in them. The motifs which are considered are of the following types; blanks, antiblanks, upper and lower pseudo-blanks.

Figure 2:
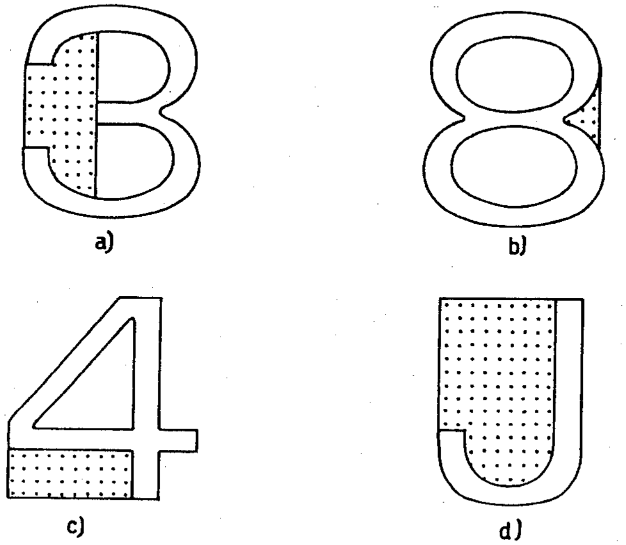
FIG. 2 shows examples of motifs which are recognised by the apparatus.

FIG. 2 illustrates one example of each of the motifs listed above; a blank in FIG. 2*a*, an antiblank in FIG. 2*b*, a lower pseudo-blank in FIG. 2*c*, an upper pseudo-blank in FIG. 2*d*, the sections following sequentially from right to left.

To define completely the motifs, other definitions are necessary, which are indicated below and divided into two groups, expressing respectively the topographical relations between the motifs present in a character and the morphological characteristics of each motif.

Topographical relations

A motif A is to the north (to the south) of a motif B if there is at least one section in which a segment of A is higher (lower) than a segment of B.

A motif A is to the east (west) of a motif B if there is a section s in which a segment a of A exists, if there is a section $s'$ with $s'>s$ (with $s'<s$), in which a segment $b$ of B exists, and if a and b belong to each other.

Morphological and metric characteristics

A separated motif is called closed when there is a segment of it of length less than a prefixed maximum length of L1 points.

A blank or a pseudo-blank is called upon open or very open if its final segment exceeds a prefixed maximum length, respectively L2 points and L3 points.

An antiblank is called open if its first segment exceeds a prefixed minimum length of L4 points.

A motif is called tall if the shadow of its segments exceeds a prefixed minimum length of L5 points.

A motif is called wide if the number of scannings in which it is present exceeds a prefixed minimum L6.

A motif is called widespread or very widespread if altogether its segments exceed a prefixed minimum length, respectively of L7 and L8 points.

From the definitions given above for the motif segments it can be seen that to determine the type of white segment which presents itself in a section it is necessary to examine the relations of the said segment to the adjacent black segments of the same section and to the shadow of the black segments of the preceding sections. To this end, the signal OC (FIG. 1), representing the whole of the white and black segments of the various sections, is fed to a processing circuit 24 for the black segments which supplies as output a series of signals 2CPT, UNS, CUNS summarising the characteristics of the black segments explored. The signal OC is also fed to a processing device 26 for the white segments, controlled by the signals 2CPT, UNS, CUNS, which sorts the white segments of each section into a motifs register 27 which suppplies as output a group of signals CX. A circuit 29 which receives as input the signals CX is adapted to supply, for each character, a group of signals CME representing the morphological and metric characteristics for each motif. The signals CX and CME go to a transcoding circuit 30 from which they emerge, respectively, as signals CXT and CMET. A circuit 28 which has as input the signals CXT is adapted to supply, for each character, a group of signals CTOT representing the topological characteristics for each motif. The signals CMET and CTOT go to the input of a categorisation circuit 31. At the output of the circuit 31 there is a signal representative of the character read.

Figures 3, 4:
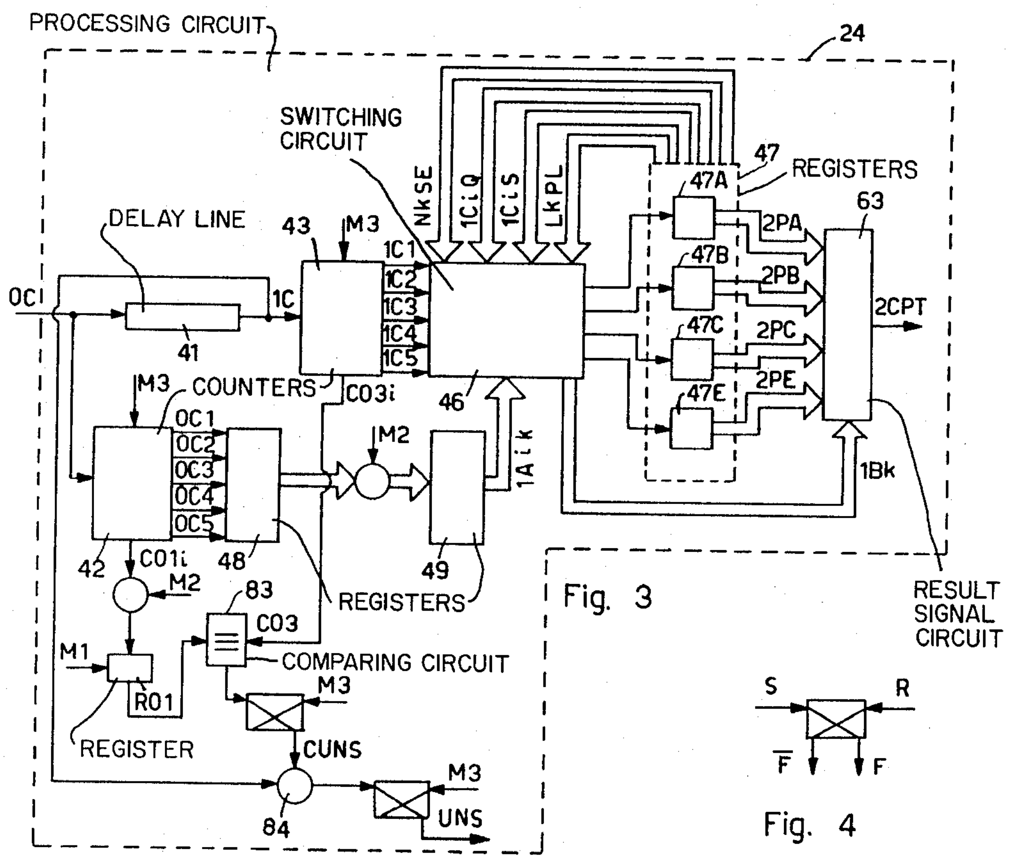
FIG. 3 shows a block diagram of the processing circuit for the black segments.
FIG. 4 shows the symbol of a bistable flip-flop.

FIG. 3 is a block diagram of the processing circuit 24 for the black segments. The signal OC, relative to a section of the character, enters a delay line 41, having a delay equal to the time used to examine one section, and emerges therefrom as signal 1C, representing the same section with a delay of one line scanning period. This concept is expressed by saying that the signal 1C represents, in phase one, a section of the character, whilst the signal OC represents the same section in phase zero. The signal OC passes to a counter 42 which, besides counting the black segments present in a section, distributes them, as soon as they appear, into five successive paths activating the outputs OC1 to OC5. A coded signal CO1i indicates the number of black segments of OC counted by the counter 42. Similarly the signal 1C passes to a counter 43 which sorts the black segments contained in it into five successive paths, activating the outputs 1C1 to 1C5. A coded signal CO3i indicates the number of black segments of 1C counted by the counter 43. At the end of the section the signal M2 enables the counter 42 to transfer the signal CO1 into register RO1, previously zeroed by M1. Thereafter the signal M3 zeroes the counter 42 and sets to 1 the indication of the counter 43.

The black segments 1Ci ($i$ = 1 to 5) are switched by the circuit 46 to four registers 47A, 47B, 47C, 47E. The circuit 46 is controlled by a series of signals NkSE, 1CiQ, 1CiS, LkPL supplied by the registers 47. The meansings of the signals NkSE, 1CiQ, 1Cis, LkPL are now given whilst the way in which they are obtained will be explained later on.

N*k*SE — indicates that the principle pertaining to the register 47*k* has been separated where *k* may be A, B, C or E.

L*k*PL — indicates that the register 47*k* is the first free one.

1C*i*Q — indicates that the segment 1C1 does not belong to any of the registers 47A, 47C.

1C*i*S — indicates that the segment 1C*i* does not belong completely to (i.e., juts out from) the shadow of the black segments belonging to separated and non-separated rudiments of the sections preceding the one under consideration. The signal representing the said show is indicated as 2CPT.

The registers 47A to 47C collect the black segments relative to principles which are not yet separated (that is which have not yet reached a certain extent), whilst the register 47E collects the black segments relative to principles which have been separated. The concept of a principle is not explained in detail here, in that it is already known in the art; a definition thereof is given for example in our U.S. Pat. No. 3,178,687.

The segments relative to various principles not yet separated are maintained in the various registers 47A to 47C, because they may arise from a blemish, rather than a true motif. If the blemish does not reach a certain extent, the corresponding principle does not manage to become separated, that is to say that after a predetermined number of sections (for example three) it does not receive further contributions. In such a case the register which had received the previous contributions thereof is emptied, so as not to retain information relating to blemishes. To do this it is necessary to retain in these different registers the contributions relating to non-separated principles. When, on the contrary, a principle is separated, since it concerns collectively at the same time the other black segments relating to separated principles, its contributions are sent to the common register 47E.

A register 48 consists of flip-flops OAiK with $i = 1$ to 5, $k$ = A to E, and signals, for a black segment O$ci$ which appears at the phase zero, if it belongs to the register 47$k$.

At the end of the section the signal M2 enables each of these flip-flops to discharge itself into a corresponding flip-flop 1A$i$K of a register 49, leaving the register 48 free for the succeeding section. Then the register 49 signals, with a group of signals 1A$ik$ dependent on the state of the corresponding flip-flops, the state of belonging of the segments 1C$i$ to that which, in phase zero, was the content of the registers 47A to 47E.

Figure 5:
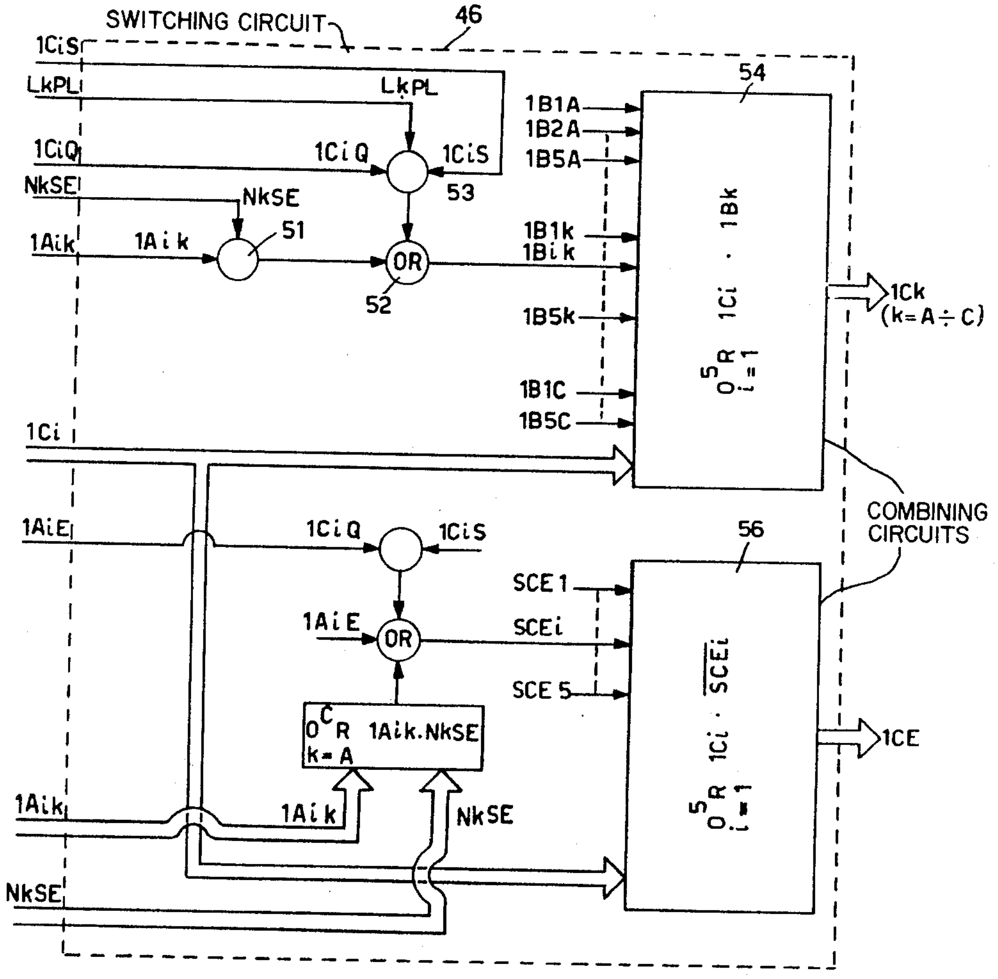
FIGS. 5 to 7 show details of the block diagram of FIG. 3.

The signal 1Aik and the signal $\overline{NkSE}$ pass to an AND circuit 51 (FIG. 5) whose output passes to an OR circuit 52. The signals 1C$i$Q, 1C$i$S, L$k$PL pass to an AND circuit 53 whose output passes to the OR circuit 52. The output of the OR circuit 52 constitutes a binary signal 1B$ik$:

$$1BiK = 1Aik \cdot \overline{NkSE} + 1CiQ \cdot 1CiS \cdot LkPL \ (= 1 \text{ to } 5,\ k = A \text{ to } C).$$

In this and the logical equations which will follow, the symbol · indicates the operation of logical product, and + indicates the operation of logical sum.

A combinatory circuit 54 has as inputs the signals 1BiK and 1Ci, and has as output the signals 1Ck switched to the corresponding registers 47k. The logical equation of the circuit 54 is as follows:

$$1Ck = \underset{i=1}{\overset{5}{OR}}\ 1Ci \cdot 1Bik$$

The symbolism $$\underset{i=1}{\overset{5}{OR}}$$

means that $1Ck$ is true if $1Ci \cdot 1Bik$ is true for any value of $i$ from 1 to 5.

The binary variable 1Bik represents therefore the input condition for the signal $1Ci$ at the register 47$k$. From the expression for $1Bik$ it can be seen that the said signal is equal to 1 (and in this case the black segment $1Ci$ has to be sent to the register 47$k$), if one of the following conditions $a$, $b$ is satisfied:

a. 1$Ci$ belongs the register 47$k$, and the principle switched to the register 47$k$ has not yet been separated;
b. 1$Ci$ does not belong to any register 47A to 47C, juts out from the shadow of the black segments belonging to separated and non-separated principles, and the register 47$k$ is the first free one.

A combinatory circuit 56 has as input the signals 1Ci and SCEi defined as follows:

$$\overline{SCEi} = 1AiE + 1CiQ \cdot \overline{1CiS} + \underset{k=A}{OR}\ 1Aik \cdot NkSE$$

and has as output the signal $1CE$ representing the segment switched to the register 47E. The logical equation of the combinatory circuit 56 is as follows:

$$1CE = \underset{i=1}{\overset{5}{OR}}\ 1Ci \cdot \overline{SCEi}$$

Therefore a black segment is shunted to the register E if one of the following conditions $c$, $d$, $e$ is satisfied:

c. 1$Ci$ belongs to the register 47E;
d. 1$Ci$ does not belong to any register 47A to 47C, and all belong to the shadow of the black segments belonging to separated principles;
e. 1$Ci$ belongs to at least one of the registers 47A to 47C, and the principle contained in that register has been separated.

From the expression 1CE it can be seen that several segments of one and the same section can arrive at the register 47E, if these belong to separated principles in accordance with what has been said above.

Figure 6:
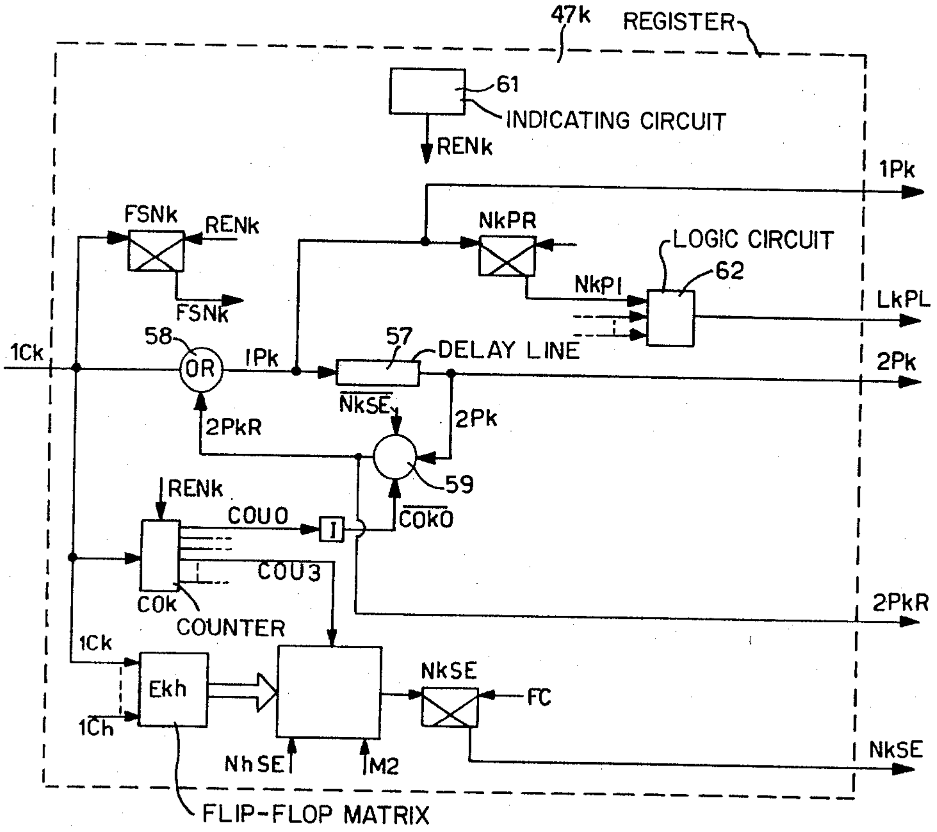

FIG. 6 is the diagram of a generic register 47$k$ ($k$ = $A$ to $C$). It comprises a delay line 57 having a delay equal to the time taken by the cathode ray tube 11 to pass from the start of a section to the start of the next section. At the input of the line 57 there is a signal 1P$k$ obtained as logical sum, effected by means of the OR circuit 58, of the signal 1C$k$ and of a signal 2PkR. The signal 2P$k$R is in its turn obtained as a logical product, effected by means of the AND circuit 59, of the output signal 2Pk of the line, of the signal $\overline{NkSE}$ and of a signal $\overline{CokO}$, the origin of which will be seen subsequently. The significance of the signal $\overline{COkO}$ is that the rudiment, whose segments are sent to the register 47k in question, is started by at least one scanning. The significance of the signal $\overline{NkSE}$, as has already been seen, is that the principle whose segments are sent to the register 47$k$ has not been separated. The signal contained in the delay line 57 continues to recycle in the same line as long as the AND gate 59 is open, that is until the following conditions $f$, $g$ are simultaneously satisfied:

f. the principle relating to the register 47$k$ is initiated by at least one scanning;
g. the same principle has not been separated.

Consequently the recycle commences with the second contribution of a principle sent to the register 47$k$, and stops when the rudiment is separated.

Each register also contains other circuits which create the auxiliary signals which have been introduced previously into the description:

A flip-flop FSN$k$ to the SET input (i.e., the S input, see FIG. 4) of which passes the signal IC$k$ which signals if during the scanning a black segment has entered into the register 47$k$; the said flip-flop is put into RESET condition by the signal M2 at the end of the section.

A flip-flop N$k$PI whose SET input is connected to the input of the line 57 which indicates if the line 57 contains anything, that is if the register 47$k$ has received any contribution from the start of the scanning of the character.

A counter CO$k$, to whose input passes the signal 1C$k$, which counts the number of contributions which have arrived at the register 47*k*. The zero output of the counter constitutes the signal CO*k*O defined earlier.

A circuit 61 whose output REN*k* is 1 as soon as there has been a scanning which has not given any contributions to the register 47*k*. The signal RENk zeroes the indicators FSN*k*, N*k*PI, COk and empties the line 57.

A logical circuit 62 whose output LkPL indicates if the register 47k is the first one free.

$$LkPL=\overline{NkPI}\cdot \underset{h=A}{\overset{k-1}{AND}}\ NhPI,$$

that is the register 47*k* is the first one free if the line 57 is not full, and if all the previous ones are full.

A symmetrical matrix Ekh of flip-flops which indicate if the same black segments enters into two registers 47*h* and 47*k* (*k*, *h* = *A*, *B*, *C*, *E*). For each flip-flop of the matrix Ekh there is, at the SET input, the signal *SET* (*Ekh*) = 1*Ck* · 1*Ch*.

A flip-flop NkSE which indicates that the principle relating to the register 47*k* is separated. The SET input of the flip-flop NkSE is constituted by the signal $$SET\ (NkSE)=M2\cdot COu3+\underset{h=A,\ h=k}{\overset{C}{OR}}\ Ekh\cdot NhSE+EkE$$

That is: the principle relating to the register 47k is separated, and therefore NkSE = 1, if one of the following conditions is satisfied:

h. The principle in question has given contributions to the register 47*k* for three scannings.

i. The same black segment enters, apart from into the register 47*k* also into another separate register 47*h*.

l. the same black segment enters, apart from into the register 47*k*, also into the register 47E which contains the separated principles.

The flip-flops F used in the present apparatus have two inputs S and R, respectively for SET and of RESET (FIG. 4), and two outputs F and $\overline{F}$, respectively direct and inverse. A signal at the input S puts the flip-flop F into SET condition, and renders the direct output F thereof true. A signal at the input R puts the flip-flop F into RESET condition, and renders the inverse output $\overline{F}$ thereof true.

The signals 2Pk which represent in phase two the content of the registers 47*k* (*k* = *A*, *B*, *C*, *E*) pass to a circuit 63 (FIG. 3) which processes them in order to generate a series of signals which represent the global result of the processing of the black segments which are being examined here, and which are:

2CP representing the shadow of the black segments of the sections from 0 to S-2, the said segments belonging to separated principles.

2CPZ representing the shadow of the black segments of the sections from 0 to S-2, the said segments belonging to separated and non-separated principles.

2CPT representing the 2CPZ in which there are eliminated the short interruptions for example of length less than three points.

An example which illustrates the significance of the signals defined above is given in FIG. 8, in which to the right of the numeral 64 being examined there are indicated graphically the signals 2CP, 2CPZ and 2CPT relating to the section *s*. It is presumed that the numeral 64 has a print irregularity 65 which comprises in 2CPZ an interruption less than three points, which is therefore filled in 2CPT.

Figure 7:
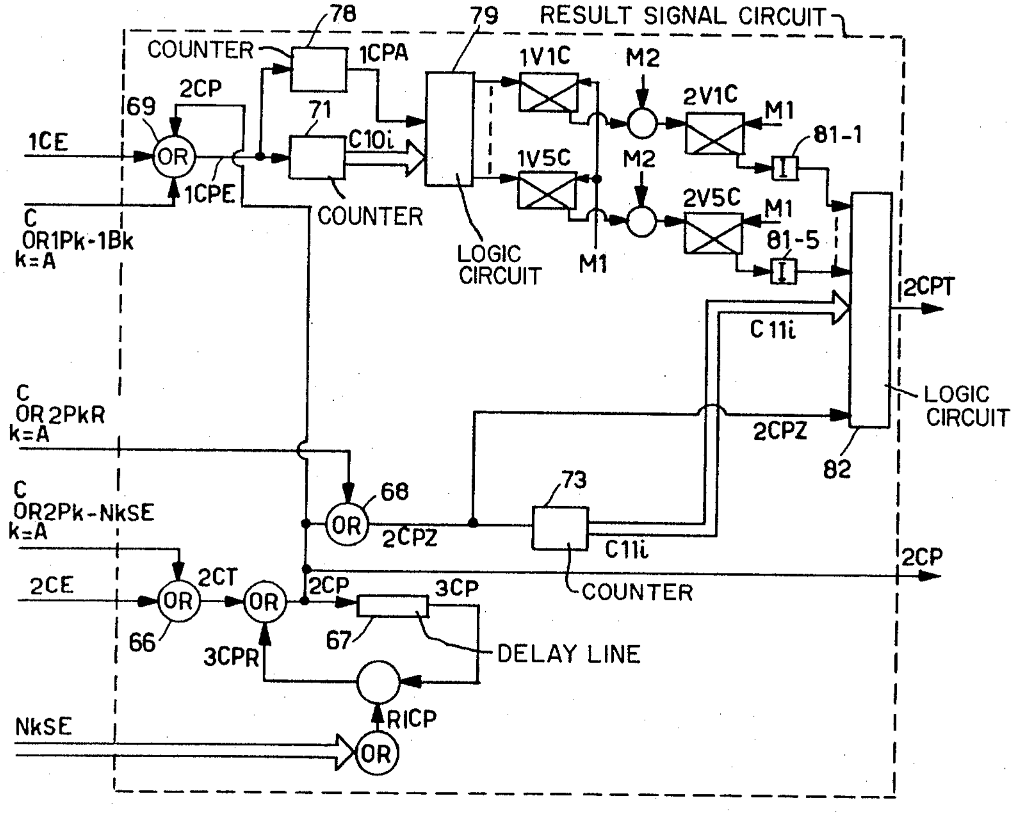

FIG. 7 is a logical diagram of the circuit 63 which generates the signals 2CP, 2CPZ, 2CPT. An auxiliary signal 2CT used for the generation of the aforesaid signals is obtained by means of the OR circuit 66:

$$2CT=2CE+\underset{k=A}{\overset{C}{OR}}\ 2Pk\cdot NkSE$$

The signal 2CT thus represents the logical sum of the content in phase two of the register 47E, which contains the separated principles, and of the content in phase two of those amongst the registers 47A to 47C which had achieved in the preceding phase the separation. Therefore 2CT represents the shadow of the black segments belonging to principles separated in phase one. The signal 2CT recycles in a delay line 67, having a delay equal to the duration of a scanning. The input at the line 67 is constituted by the signal 2CP, obtained as logical sum of the signal 2CT and of a signal 3CPR. This latter is in its turn the logical product of an output signal 3CP of the line 67 and of a signal RICP which gives the consent to the recycle in the line 67.

$$RICP=\underset{h=A}{\overset{C}{OR}}\ NkSE,$$

through which the consent to the recycle is given if there is separated at least one amongst the principles whose segments are sent to the registers 47A to 47C. In the contrary case it is useless to cause the signal 2CT to recycle, in that 2CT is reduced to 2CE which is already available in the register E. The recycle is, on the contrary, necessary if at least one of the principles relating to the registers 47A to 47E is separated, because in this case 2CP stores something more than that which is to be found in the register E.

The signal 2CPZ is obtained as logical sum, through the OR circuit 68, of 2CP and of a signal $$\underset{k=A}{\overset{C}{OR}}\ 2PkR:\ 2CPZ=2CP+\underset{k=A}{\overset{C}{OR}}\ 2PkR$$

The second term of the logical sum taken into account segments belonging to non-separated principles. A counter 73 counts the number C11*i* of segments of 2CPZ.

Ultimately, in the processing of the white segments, which will be seen in the following, the signal 2CPZ is not used in itself. It serves instead to generate the signal 2CPT, already defined. For the generation of this signal it is clearly necessary to know the course of the signal 2CPZ with an advance scanning. For example, (FIG. 8), at the point N one will maintain high the level of the signal 2CPT, if it is known in advance that after N there is an interruption less than three points.

To generate the signal 2CPT it is necessary to generate an auziliary signal 1CPE which represents, in phase one, that which in phase two will be the signal 2CPZ; therefore the knowledge of 1CPE allows one to know with an advance scanning the course of 2CPZ.

One can demonstrate that the signal 1CPE is given by:

$$1CPEZ=1CE+2CP+\underset{k=A}{\overset{C}{OR}}\ 1Pk\cdot iBk.$$

In fact we have (indicating by an index beside the name of a signal the number of the section to which this signal refers):

$$
\begin{aligned}
(2CPZ)^{n+1} &= \Big(2CP + \underset{k=A}{\overset{C}{OR}}\ 2PkR\Big)^{n+1} \\
&= (2CP)^{n} + (2CT)^{n+1} + \Big(\underset{k=A}{\overset{C}{OR}}\ 2PkR\Big)^{n+1} \\
&= (2CP)^{n} + \Big(2CT + \underset{k=A}{\overset{C}{OR}}\ 2PkR\Big)^{n+1} \\
&= (2CP)^{n} + (2CE)^{n+1} + \Big(\underset{k=A}{\overset{C}{OR}}\ 2Pk \cdot NkSE\Big)^{n+1} \\
&\quad + \Big(\underset{u=4,\,k=A}{\overset{u=6,\,k=c}{OR}}\ 2PK \cdot \overline{NkSE} \cdot \overline{COuO}\Big)^{n+1} \\
&= (2CP)^{n} + (1CE)^{n} + \Big(\underset{k=A}{\overset{C}{OR}}\ 1Pk \cdot 1Bk\Big)^{n}
\end{aligned}
$$

The signal 1CPE is obtained (FIG. 7) by adding logically the terms $$1CE,\ 2CP,\ \underset{k=A}{\overset{C}{OR}}\ 1PK \cdot 1BK$$

by means of an OR circuit 69. A counter 71 counts the segments of 1CPE.

By means of the signal 1CPE there is generated another auxiliary signal 1CPA, obtained from the signal 1CPE by lengthening each of its segments by two points. This is effected by means of the counter 78. The signal 1CPA passes, together with the outputs C10i of the counter 71, to a logical circuit 79 which generates a series of signals $\overline{1CPA}$ C10i ($i$ = 1 to 5). Each of these signals passes to the SET input of a corresponding flip-flop 1V*i*C. At the end of section the flip-flops 1VIc are put into RESET conditions, whilst the preceding SET output of each flip-flop 1V*i*C is stored in a corresponding flip-flop 1V*i*C. The signals 2V*i*C are then inverted by means of the inverters S1*i*.

A logical circuit 82 processes the signals $\overline{2ViC}$, the signal 2CPZ and the signals C11*i*, supplying in output 2CPT:

$$2CPT = 2CPZ + \underset{i=1}{\overset{C}{OR}}\ \overline{2CPZ} \cdot 2ViC \cdot C11i.$$

In conclusion a signal UNS represents the final black segment of a section. To generate the signal UNS it is obviously necessary to have first counted the number of segments of that very section, so as to be able to know when the last black segment is arriving. A circuit 83 (FIG. 3) compares the indication of the register RO1 with the indication of the counter CO3 and supplies the output 1 when the said two indications are equal. The register RO1 indicates, in phase one, the total number of segments of the section under consideration which had been counted in phase zero; the register RO1 indicates, in phase one, the actual number of the segments of the section under consideration, increased by 1; the attainment of coincidence between R*o*1 and CO3 indicates therefore the arrival of the final black segment of the section under consideration. The output of the circuit 83 passes to a flip-flop CUNS.

The output of the circuit 83 sets the flip-flop CUNS, making the direct output true. The condition *CUNS* = 1 indicates the arrival of the final black segment of the section under consideration. The signal CUNS and the signal 1C pass to an AND circuit 84 whose output puts into SET condition a flip-flop UNS; the signal UNS represents the final black segment of the section examined. The flip-flops UNS and CUNS are put back into RESET condition by the signal M3.

Figure 9:
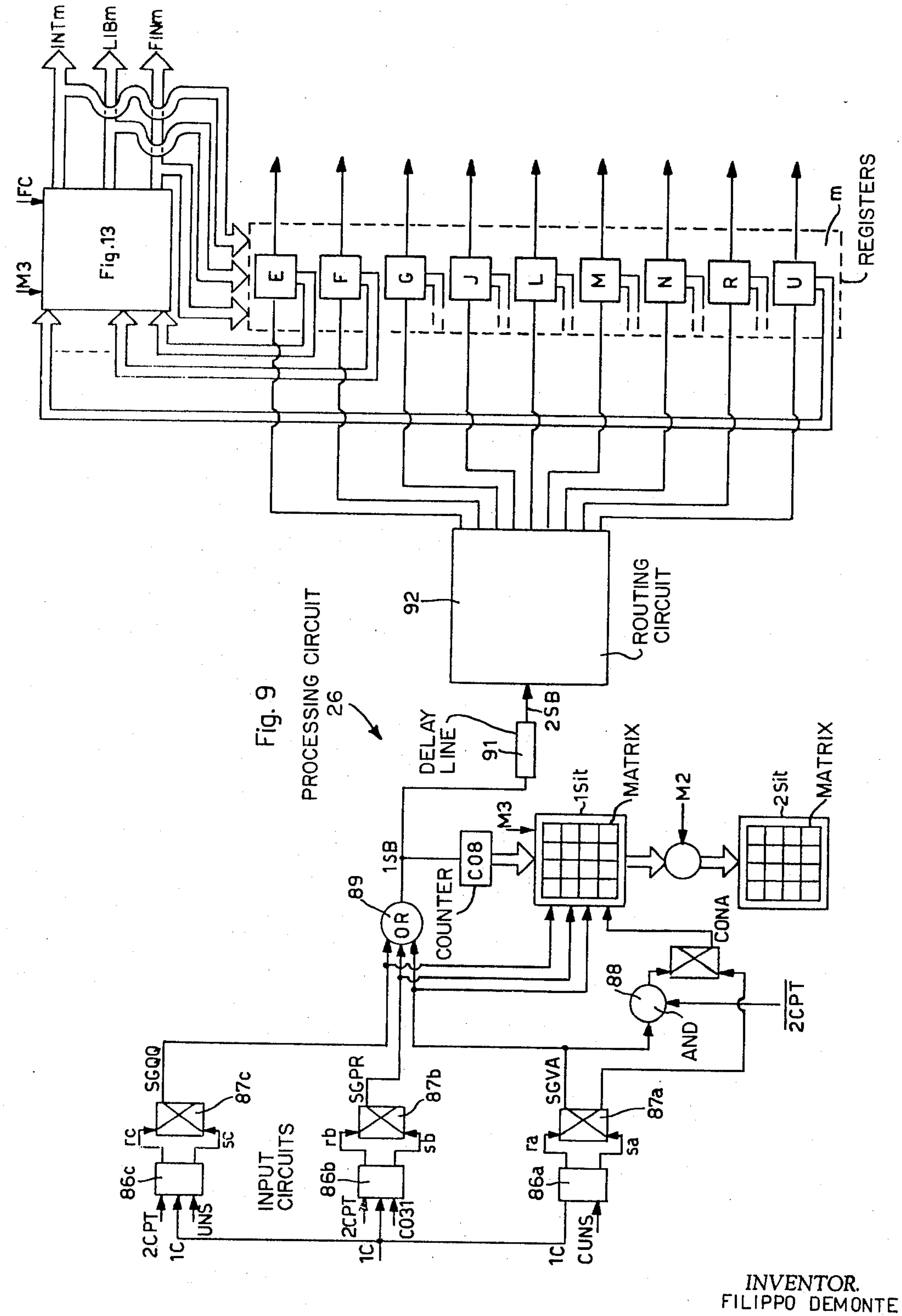
FIG. 9 shows a block diagram of the processing circuit for the white segments.

We now describe the processing circuit 26 for the white segments, of which a block diagram is represented in FIG. 9. A circuit 86*a* has as inputs the signals 1C and CUNS. A circuit 86*b* has as inputs the signals 1C, 2CPT and CO31, the latter indicating that the content of the counter CO3 is 1. A circuit 86*c* has as inputs the signals 1C, 2CPT, UNS.

The circuit 86*a* provides output signals *sa* and *ra* expressed by:

$$sa = d(\overline{1C}) \cdot \overline{CUNS}$$

$$ra = IC$$

In the expression for *sa*, $d(\overline{1C})$ indicates the derivative of the edge of the signal $\overline{1C}$.

The circuit 86*b* provides output signals *sb* and *rb* expressed by:

$$sb = 2CPT \cdot CO31 \cdot \overline{1C}$$

$$rb = 1C1 + \overline{2CPT}$$

The circuit 86*c* provides output signal *sc* and *re* expressed by:

$$sc = \overline{1C} \cdot 2CPT \cdot CUNS$$

$$re = \overline{2CPT}$$

The outputs *se*, *re* of the circuits 86*e* (*e* = *a* to *c*) are applied to the SET and RESET inputs respectively of corresponding flip-flops 87*e*. The direct outputs of the flip-flop 87*a*, 87*b* and 87*c* are signals SGVA, SGPR and SGQQ respectively.

Figure 10:
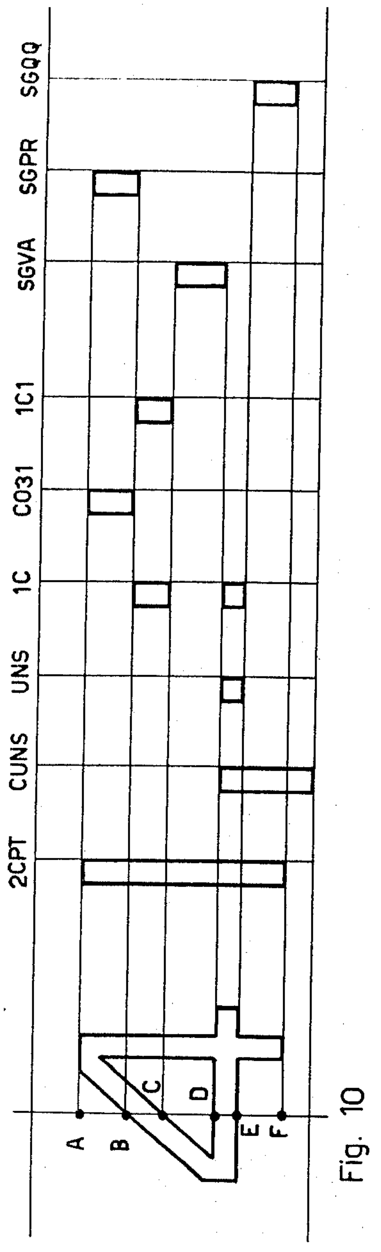
FIG. 10 illustrates through a numerical character the determination of the motif segments.

The signal SGVA represents the blank and antiblank segments. In fact SGVA becomes 1 at the point C (FIG. 10) when 1C passes from 1 to 0 (that is when in a section one passes from a black segment to a white one), and *CUNS* = 1, (that is when the final black segment of the section has not yet arrived). SGVA returns to zero at the point D when *1C* = 1, that is when a black segment is encountered.

The signal SGPR represents the upper pseudo-blank segments. In fact SGPR becomes 1 at the point A, when 1C = 0 (that is a white segment is encountered), and simultaneously *2CPT* = 1 (that is the white segment stands in the shadow of the black one), and *CO31* = 1 (that is black segments have not yet been encountered in the section under consideration). The signal SGPR then returns to zero at the point B, when *1C1* = 1) that is the first black segment is encountered) or when *2CPT* = 0, that is, when one emerges from the shadow of the black segments of the preceding scannings.

The signal SGQQ becomes 1 at the point E (FIG. 10) when *1C* = 0 (that is a white segment is encountered), and simultaneously *2CPT* = 0 (that is the white segment stands in the shadow of the black segments of the preceding scannings), and *CUNS* = 1 (that is the final black segment of the section has been encountered). SGQQ returns to zero at the point F, when $\overline{2CPT} = 0$, that is when one emerges from the shadow of the black segments of the preceding scannings.

The logical product of SGVA and of $\overline{2CPT}$, effected by means of the AND circuit 88 (FIG. 9) passes to the SET input of a flip-flop CONA, whilst at the RESET input of the same flip-flop CONA there appears the signal $\overline{SGVA}$. Therefore:

$$SET\ (CONA) = \overline{2CPT} \cdot SGVA$$

$$RESET\ (CONA) = \overline{SGVA}$$

When $CONA = 1$ the segment represented by SGVA is an antiblank segment; when $CONA = 0$ it is a blank segment. In fact, if $CONA = 1$ SGVA does not stand in the shadow of the black segments of the preceding sections, that is SGVA is an antiblank segment.

The signals SGVA, SGPR and SGQQ pass to an OR circuit 89 at the output of which there is collected a signal 1SB which represents the whole of the blank, antiblank and pseudo-blank segments.

A counter CO8 counts the segments contained in the signal 1SB, recording for each of them whether it is a blank segment, antiblank segment, or upper or lower pseudo-blank segment by means of a matrix 1Sit comprising 16 flip-flops 1S*i*A, 1S*i*V, *i*S*i*P, 1S*i*Q ($i = 1$ to b 4). By means of $t = A, V, P, Q$ is indicated the type of motif, while $i$ indicates the number of the motif of a class of motifs of the same type, in the order in which it is presented. For each section the matrix 1S*it* represents the situation relating to that section. The matrix 1S*it* is controlled by Co8 and by SGVA, SGPR, SGQQ, CONA. At the end of section the signal M2 enables the transfer of the matrix 1S*it* into a matrix 2S*it* of the same type, and the signal M3 clears the flip-flops of the matrix 1S*it* which remains free for the next section.

The signal 1SB passes to a delay line 91 having a delay equal to the time taken by the cathode ray tube 11 to pass from the start of one section to the start of the next section; at the output of the line 91 there is collected a signal 2SB. The signals corresponding to the segments of 2SB are routed from a routing circuit 92 to nine registers *m*, corresponding, in one embodiment of the present invention, to the nine motifs which at the most can present themselves in each character.

Each register *m* is indicated with a letter of the alphabet, namely:

E, F, G for the antiblanks;

J, L, M, N for the blanks;

R for the upper pseudo-blanks;

U for the lower pseudo-blanks.

There will now be discussed the procedure on the basis of which the signals representing the segments of the various sections of a character are routed to the registers *m*.

The first white segment of a motif of a family X of motifs which one finds during the scanning process is assigned to the first register X1 relating to that family X of motifs, in the order indicated before. If in the next section there is found one and only one white segment of a motif of the family X which belongs only to the segment previously found, it is assigned to X1, and so forth. As soon as a white segment is assigned to X1, a binary variable LIBX1 assumes the value 0, to indicate that the register X1 is occupied (is not free). When in X1 there has been the number of contributions established by the separation (see the previous definition), a binary variable SEPX1 assumes the value 1, to indicate that the motif Xi has been separated.

It is presumed that one finds at a certain point a section which does not give contributions to X1. Two cases are possible. If the corresponding motif has already been separated, a binary variable INTX1 assumes the value 1, to indicate that the motif X1 has been interrupted. If, on the contrary, the corresponding motif has not yet been separated, the binary variable LIBX1 assumes the value 1, to indicate that the register X1 has been freed, in that one presumes that the preceding contributions addressed to X1 were to be attributed to a blemish. Supposing that the motif X1 had been interrupted, one presumes to find a certain number of successors Y*k*. Correspondingly a certain number of binary variables SUX1Yk assumes the value 1. If all the successors Y*k* do not manage to be separated, each successive white segment, belonging to a motif of the family of X1 and such as to belong it alone through its section to the sole motif X1, is sent to the register X1. Correspondingly the binary variable INTX1 assumes the value 0.

If the motif X1 closes, or if, after an interruption, one separates at least one successor to it, it is said that the motif X1 is finished, and correspondingly a binary variable FINX1 assumes the value 1.

Figure 11:
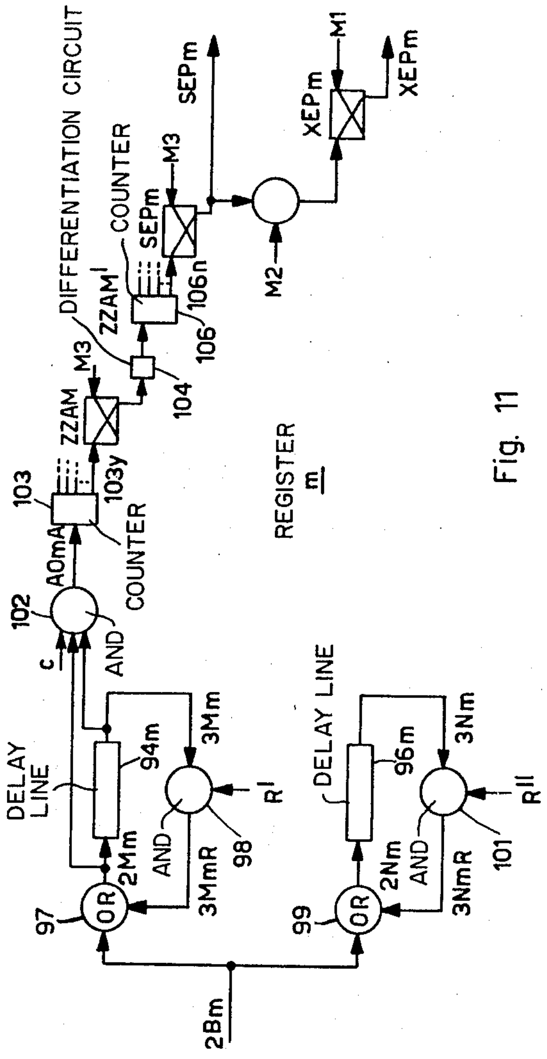
FIGS. 11 to 14 show further details of the block diagram of FIG. 1.

Each register *m* (FIG. 11) comprises two delay lines, **94*m*, 96*m*, each of which has a delay equal to the time taken to explore one section of a character. At the input of the delay line 94*m* there appears a signal 2M*m* obtained as logical sum, by means of the OR circuit 97, of the signal 2B*m* routed to the relative register and of a signal 3M*m*R. The signal 3M*m*R is obtained as logical product, effected by means of the AND circuit 98, of a signal 3Mm present at the output of the delay line 94*m*** and of a signal $R' = (INTm + FINm) \cdot \overline{2CT}$. It will be seen subsequently how the signals INT*m* and FIN*m* are generated, indicating that the relative motif *m* is interrupted or finished.

At the input of the delay line **96*m* there appears a signal 2Nm obtained as logical sum, by means of the OR circuit 99, of the signal 28*m* routed to the relative register and of a signal 3N*m*R. The signal 3N*m*R is obtained as logical product, effected by means of the AND circuit 101 of a signal 3Nm present at the output of the delay line 96*m*** and of a signal $R'' = \overline{LIBm}$. It will be seen subsequently how the signal LIB*m* is generated, indicating that the relative register is free.

The delay line **94*m* stores for the duration of the scanning of a section the final segment of the relative motif, whilst the delay line 96*m* stores the logical sum (shadow) of the segments of the motif. If the motif is interrupted, its final segment continues to recycle in the line 94*m*. If the register is freed, the recycle of the logical sum of the segments of the corresponding motif in the line 96*m* is interrupted; if the motif finishes, its final segment continues to recycle in the line 94*m*** in order to be used at the end of character for the indication relating to the closure of the relative motif.

The signal 2Mm representing the segment sent to the register *m*, the signal 3Mm representing the segment sent to the register *m* in the previous section and the timing signal *c* pass to an AND circuit 102 which supplies as output an impulse AO*m*A for each point of belonging of **2M*m* and 3M*m***. The impulses AO*m*A are counted by a counter 103 whose *y*th output passes to the SET input of a flip-flop ZZAM. A circuit 104 effects the derivative ZZA$m'$ of ZZA$m$, the direct output of the corresponding flip-flop; ZZA$m'$ will therefore be constituted by as many impulses as there are consecutive sections in which the segments of the motif $m$ belong to one another. A counter 106 counts the impulses ZZAm'. The $n$th output of the counter 106 constitutes a signal BBmA, which passes to the SET input of a flip-flop SEPm. At the end of scanning the signal SEPm, the direct output of the corresponding flip-flop, through the AND circuit 107, passes to the SET input of a flip-flop XEPm which stores SEPm for the next section.

Figure 12:
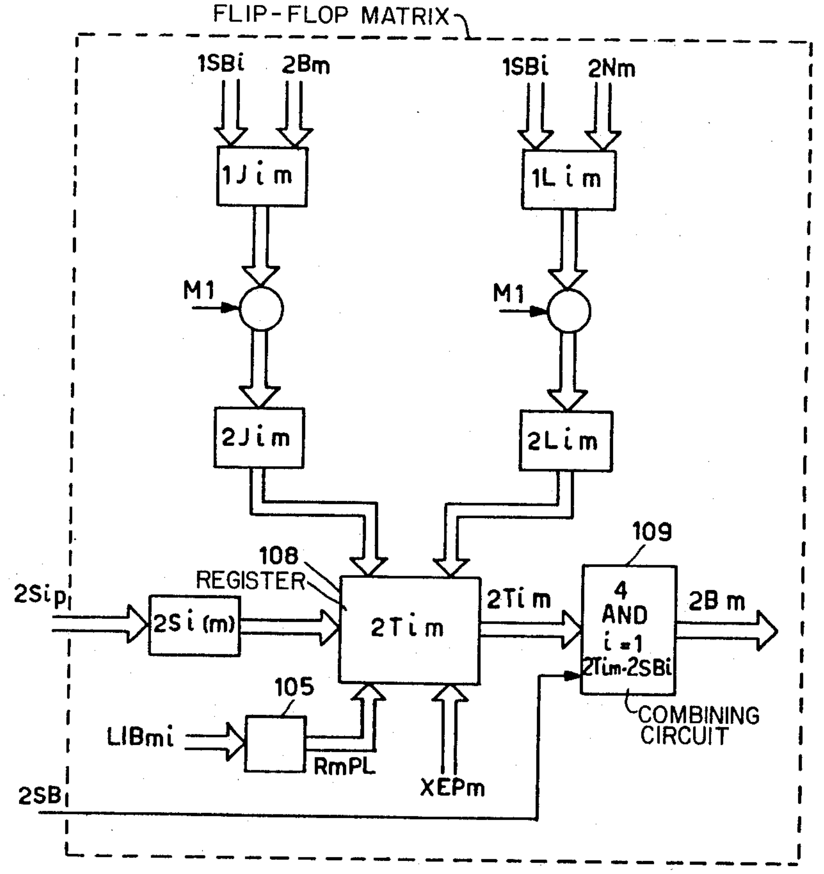

The routing of the signal 2SB to the registers $m$ occurs in practice in the following manner. A matrix of 4 × 9 flip-flops [1 J$im$] ($i = 1$ to 4, $m = E$ to $U$) (FIG. 12) stores to which of the signals sent in the previous scanning to the registers $m$ belongs the $i$th segment of 1SB. We choose $i = 1$ to 4 on the basis that in the characters which the present apparatus recognises there present themselves in one and the same section at the most four segments belonging to different motifs. Each flip-flop 1 J$im$ is put into SET condition by a signal 1SB$i$. 2Bm, which assumes the value 1 when the ith segment of 1SB belongs to 2Bm, which represents in phase 2 the signal shunted to the register m in the previous scanning. At the end of section the information contained in the matrix [1 J$im$] is transferred into a similar matrix [2 J $im$]. Another matrix of 4 × 9 flip-flops [1 L$im$] stores the lines 96$m$ to which the $i$th segment of 1SB belongs. Each flip-flop 1 L$im$ is put into SET condition by a signal 1SB$i$ · 2N$m$. At the end of section the matrix [1 L$im$] is transferred into a similar matrix [2 L$im$].

A segment 2SB$i$ is sent to the register $m$ if one of the conditions listed below is satisfied:

a. The segment 2SB$i$ is of the family of $m$, and m is not separated; furthermore 2SBi belongs to m through 2 J$im$, and does not belong through 2 J$im$ to any motif $n \neq m$ non-interrupted, and no 2SBj ≠ 2Sbi belongs to $m$ through 2J$jm$.

b. 2SB$i$ is of the family of $m$, and $m$ is separated; furthermore 2SB$i$ belongs to $m$ through 2 J$im$ and does not belong, through 2 J$im$ or 2 L$im$ , to any motif $n \neq m$, and no *2SBj* ≠ *2SBi* belongs to $m$ through 2 J$im$ or 2 L$jm$.

c. 2SB$i$ is of the family of $m$, belongs through 2L$im$ to the interrupted motif $m$, does not belong through 2J$in$ or 2L$in$ to any motif $n$, and no *2SBj* ≠ *2SBi* belongs through 2J$im$ or 2L$jm$ to $m$.

d. 2SB$i$ is of the family of $m$, does not verify any of the preceding conditions for any other motif of the family, and $m$ is the first free register of that family.

The coming to pass of one of the first three cases causes the assumption of the value 1 by a binary variable 2Eim thus defined:

$$2Eim = 2Si(m)2Jim \cdot \overline{XEPm} \cdot \underset{n=E,\, m\neq M}{\overset{U}{\mathrm{AND}}} \overline{2Jin} \underset{i=j,\, j\neq i}{\overset{U}{\mathrm{AND}}} \overline{2Jjm}$$

$$+ 2Jim \cdot XEPm \cdot \underset{n=E,\, n\neq m}{\overset{U}{\mathrm{AND}}} (\overline{2Jin} \cdot \overline{2Lin}) \cdot \underset{i=j,\, j\neq i}{\overset{4}{\mathrm{AND}}} (\overline{2Jjm} \cdot \overline{2Ljm})$$

$$+ 2Lim \cdot \underset{n=E,\, n\neq m}{\overset{U}{\mathrm{AND}}} (\overline{2Jin} \cdot \overline{2Lin}) \cdot \underset{j=1,\, j\neq i}{\overset{4}{\mathrm{AND}}} (\overline{2Jjm} \cdot \overline{2Ljm})$$

The occurrence of case 1 causes the value 1 to be assumed by a binary variable 2F$im$ defined in this way:

$$2Fim = 2Sim \cdot \underset{n=E,\, n\neq m}{\overset{U}{\mathrm{AND}}} \overline{2Ein} \cdot RmPL$$

Therefore the realisation of one of the cases a) to d) causes the value 1 to be assumed by a binary variable 2 T$im$ defined in this way:

$$2Tim = 2Eim + 2Fim$$

In the expressions written above 2S$i(m)$ indicates the logical sum of the 2S$ip$ relating to all the motifs F of the family ($m$) to which $m$ belongs; RmPL indicates that the register $m$ is the first free one of its family ($m$). RmPL is obtained from a combinatory circuit 105 whose logical equation is:

$$RmPL = LIBm1 + LIBm2 \cdot \overline{LIBm1} + LIBm3 \cdot \overline{LIBm2} \cdot \overline{LIBm1} + \ldots + LIBmp \cdot LIBmp\text{-}s \cdot \ldots \cdot \overline{LIBm1}$$

The signals 2T$im$ are stored in a flip-flop register 108. A circuit 109 has input 2T$im$ and 2SB, and output the signals 2B, representing the segments sent to the registers $m$.

The equation of the circuit 109 is:

$$2Bm = \underset{i=1}{\overset{4}{\mathrm{AND}}} 2Tim \cdot 2SBi$$

We now describe the generation of the signals LIB$m$, FIN$m$, INT$m$ mentioned above.

A register $m$ is considered free when one of the following conditions occurs:

e. The motive $m$ contained in it is not separated and is successor of a single motif $n$; is of the family of $m$, and has $m$ as single successor. In such a case $m$ is to be considered as a continuation of $n$.

f. The motive $m$ is not separated and no further contributions arrive in the next section. In such a case $m$ is to be considered non-existent, and due solely to a blemish.

g. The character finishes.

A register $m$ causes on the other hand to be considered free when a motif segment is sent to it.

From what has been said it can be seen that it is necessary, to generate the signal LIB$m$, to have a matrix [SU$mn$] which indicates if the motif $m$ is or is not successor of the motif $n$.

Figure 13:
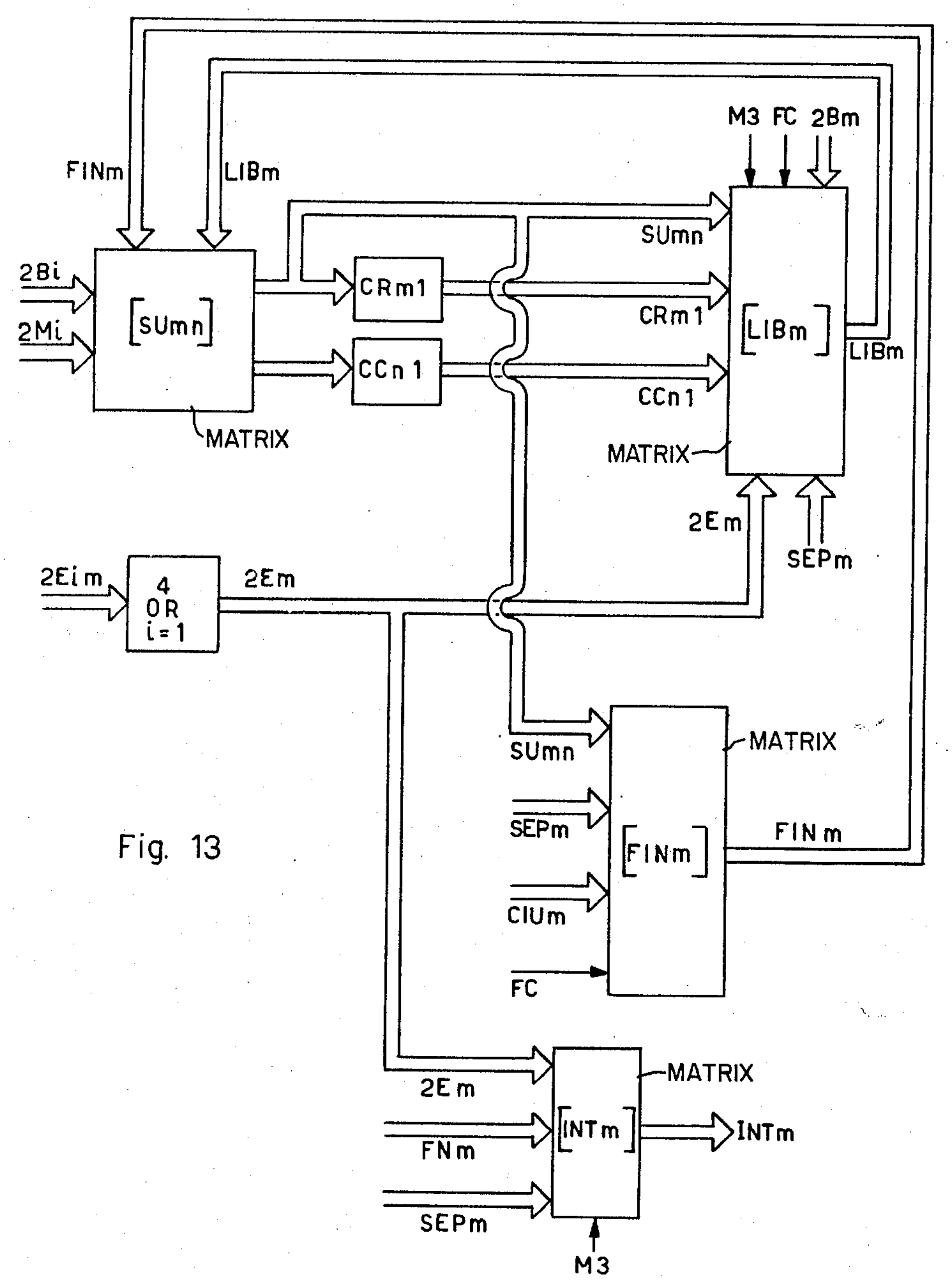

The matrix [SU$mn$] is constituted (FIG. 13) by a flip-flop register SUmn, to the SET and RESET inputs of which there are presented respectively the following signals:

$$SET\ (SUmn) = 2Bm \cdot 2Mn \cdot \overline{FINn}$$

$$RES\ (SUmn) = FINn + LIBn$$

Therefore a motif $m$ is successor of a motif $n$, and correspondingly $SUmn = 1$, if $n$ is separated and not finished, and if the first segment 2B$m$ of $m$ belongs to the segment 2M$n$ which is the final segment sent to the register $n$. The motif $m$ is no longer considered successor of $n$, if $n$ is finished or is free.

To generate the signal LIB$m$ it is again necessary to have two signals CR$m$1 and CC$n$1, expressing, respectively:

h. when a motif $m$ is successor of a single motif $n$;

i. when a motif $n$ has a single successor.

The expressions of CRm1 and CCn1 are:

$$CRm1 = \underset{q=E,\, q\neq m}{\overset{U}{OR}} SUmq \cdot \underset{n=E,\, n\neq m,\, n\neq q}{\overset{U}{AND}} \overline{SUmn}$$

$$CCn1 = \underset{q=E,\, q\neq n}{\overset{U}{OR}} SUqn \cdot \underset{m=E,\, m\neq n,\, m\neq q}{\overset{U}{AND}} \overline{SUmn}$$

The signals LIBm are given by the SET outputs of a flip-flop matrix [LIB$m$] at the SET and RESET inputs of which there are supplied respectively the signals:

$$SET(LIBm) = CRm1 \cdot \underset{n=(m),\, n\neq m}{OR} CCn1 \cdot SUmn \cdot \overline{SEPm} + \overline{2Em} \cdot Sepm \cdot M3 + FC$$

$$RES(LIBm) = 2Bm \qquad \left(2Em = \overset{4}{\underset{i=1}{OR}}\, 2Eim\right)$$

A motif $m$ is considered finished when one of the following conditions $l$, $p$, $q$ is verified:

1. There exists a separated motif $n$ which is successor of $m$. In this case it is evident that there had occurred a branching of a line, or a union of two lines, and therefore further contributions should not be sent to the motif $m$.

p. The motif $m$ closes.

q. The character finishes.

The signals FINm are given by the SET outputs of the flip-flops of a matrix [FIN$m$] at the SET inputs of which there are supplied the signals:

$$SET(FINm) = \underset{n=E,\, n\neq m}{\overset{U}{OR}} SUmn \cdot SEPn + CIUm + FC$$

A motif $m$ is declared interrupted when a successor to it exists. The interruption can have an end either because the motif $m$ finishes, or because none of its successors is separated. The signals INTm are given by the outputs of a flip-flop matrix [INT$m$], at the SET and RESET inputs of which there are supplied respectively the signals:

$$SET\ (INTm) = \overline{2Em} \cdot \overline{FINm} \cdot \overline{SEPm} \cdot M3$$

$$RES\ (INTm) = (2Em + FINm) \cdot M3$$

Figure 14:
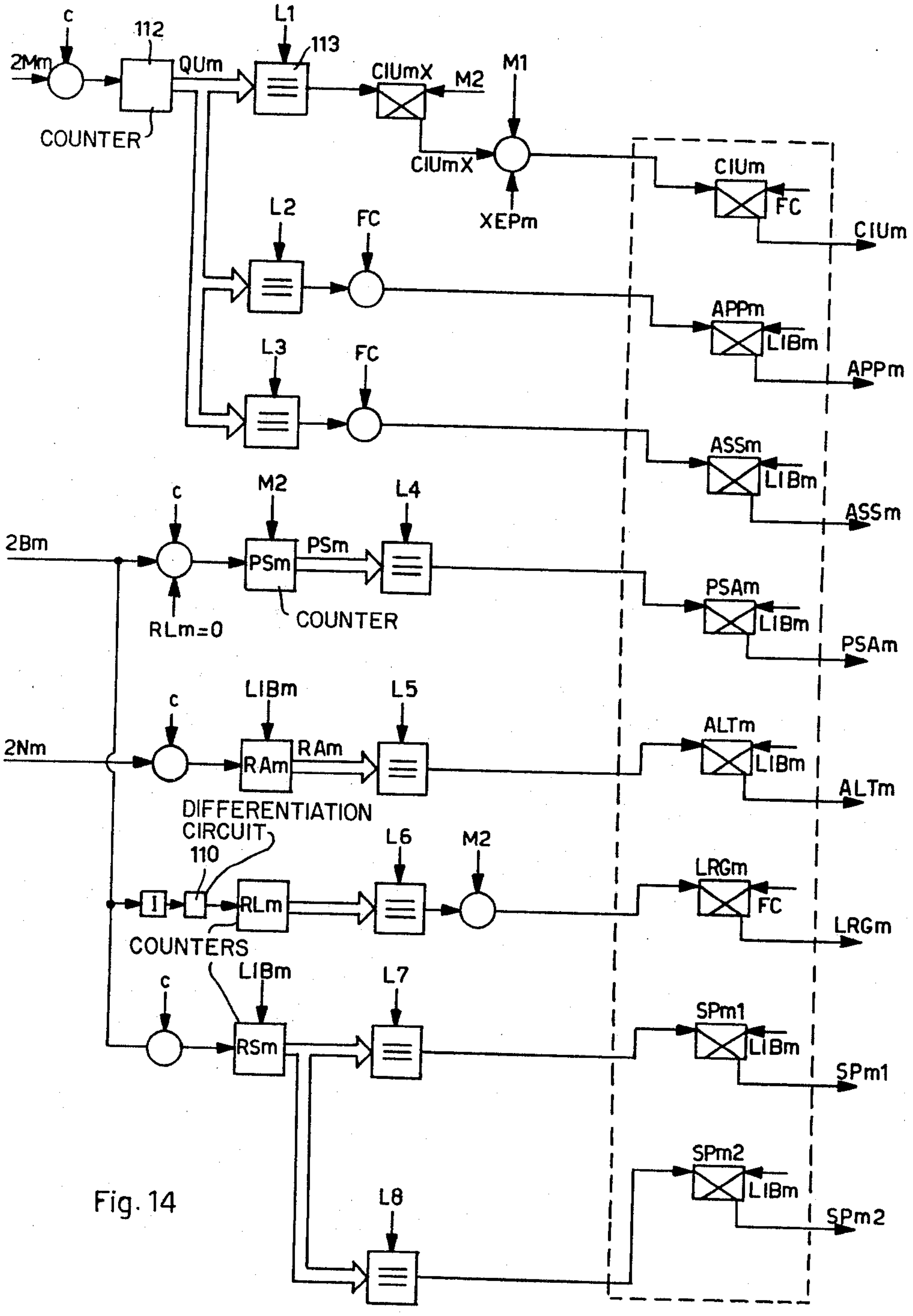

The morphological and metric characteristics of each character are stored in the matrix 111 by means of the flip-flops CIU$m$, APP$m$, Ass$n$, PSA$m$, ALT$m$, LRG$m$, SP$m$1, SP$m$2 (FIG. 14).

The flip-flops CIUm register if a motif $m$ is closed. A counter 112 counts the length of 2M$m$; at the input of the counter 112 there appears in fact the AND of 2M$m$ and of the synchronisation signal $c$. The indication QU$m$ of the counter 112 passes to the input of a comparator 113 which gives output 1 when $QUm = L1$.

A flip-flop CIU$m$X has at the SET and RESET inputs respectively the signals:

$$SET\ (CIUmX) = (QUm = L1)$$

$$RES\ (CIUmK) = M2$$

A flip-flop CIUm has at the SET and RESET inputs respectively the signals:

$$SET\ (CIUm) = \overline{CIUmX} \cdot M1 \cdot XEPm$$

$$RES\ (CIUm) = FC$$

The flip-flops APP$m$ register if a blank or a pseudoblank $m$ is open. For these there is:

$$SET\ (APPm) = (QUm = L2) \cdot FC$$

$$RES\ (APPm) = LIBm$$

The flip-flops ASSm register if a blank or a pseudoblank $m$ is very open. for these there is:

$$SET\ (ASSm) = (QUm = L3) \cdot FC$$

$$RES\ (ASSm) = LIBm$$

The flip-flops PSAm register if an antiblank $m$ ($m = E, F, G$) is open. A counter PSm counts the length of the first segment of an antiblank; the counting impulses of PS$m$ are given by $2Bm \cdot c \cdot (RLm = o)$. RL$m$ is a counter which counts the scannings of the motif. The counting impulse of RL$m$ is given by $d(\overline{2Bm})$, that is by the derivative of the front edge of $\overline{2Bm}$, effected by the circuit 110. The condition $RLm = o$ serves to cause the count on the first segment of the antiblank m to be effected. The counter PS$m$ is emptied at each end of section by M2. For each flip-flop PSA$m$ there is:

$$SET\ (PSAm) = (PSm = L4)$$

$$RES\ (PSAm) = LIBm$$

The flip-flops ALTm register if a motif $m$ is high. A counter RA$m$ measures the shadow of the motif $m$; its counting impulse is in fact 2N$m \cdot c$. The counter RA$m$ is emptied by the signal LIB$m$ when the register corresponding to the motif $m$ is freed. For each flip-flop ALT$m$ there is:

$$SET\ (ALTm) = (RAm = L5)$$

$$RES\ (ALTm) = LIBm$$

The flip-flops LRG$m$ register if a motif $m$ is wide. For each flip-flop LRG$m$ there is:

$$SET\ (LRGm) = (RLm = L6) \cdot M2$$

$$RES\ (LRGm) = FC$$

The flip-flops S$pm$1 and S$pm$2 register if a motif $m$ is widespread or very widespread. A counter RS$m$ counts the points of the motif segments; its counting impulses are given by 20$m \cdot c$. The counter RS$m$ is emptied by the signal LIB$m$ when the register corresponding to the motif $m$ is freed. For each flip-flop SPm1 there is:

$$SET\ (SPm1) = (RSm = L7)$$

$$RES\ (SPm1) = LIBm$$

For each flip-slop SPm2 relating to a blank or antiblank motif $m$ there is:

$$SET\ (SPm2) = (RSm = L8)$$

$$RES\ (SPm2) = LIBm$$

According to the routing logic of the white segments to the registers previously described, it can be seen that the first motif which is separated into a family of motifs can be any one of the names of the family.

Figure 15:
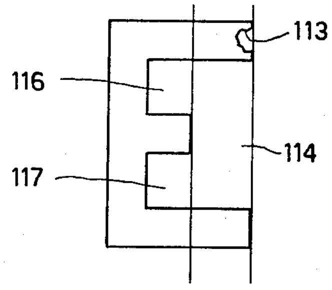
FIG. 15 illustrates the motifs present in a numerical character which has a print irregularity.

For example, let one consider a letter E (FIG. 15) which has a print irregularity 113. By scanning the first section of the character there are found two antiblank segments relating to the areas 113 and 114, which will be sent, respectively, to the registers E and F. If the motif relating to the area 113 is not separated, the register E remains free, whilst the segments of the area 114 continue to be sent to the register F. Subsequently there will be encountered the registers of the antiblank motifs 116 and 117 which will be sent to the registers E and G respectively. In the normal case, that is in the absence of an irregularity of the type indicated, the motifs 114, 116, 117 would have assumed respectively the names E, F, G; in this case, on the contrary, these assume respectively the names F, E, G. If the character E is recognised on the basis of the presence of three antiblanks E, F, G, of which E is to the east of F and of G and F is to the north of G, the presence of an irregularity of the type seen would not permit it to be recognised, except by using complicated equations of categorization.

For the purposes of the recognition of the characters it is therefore convenient that the motifs are arranged on the basis of their separation sequence. To this end, one effects a transcoding of the motifs, which consists in assigning to each register, apart from its own name, a variable transcoded name which depends on the order of the separations of the motifs of the family.

Figure 16:
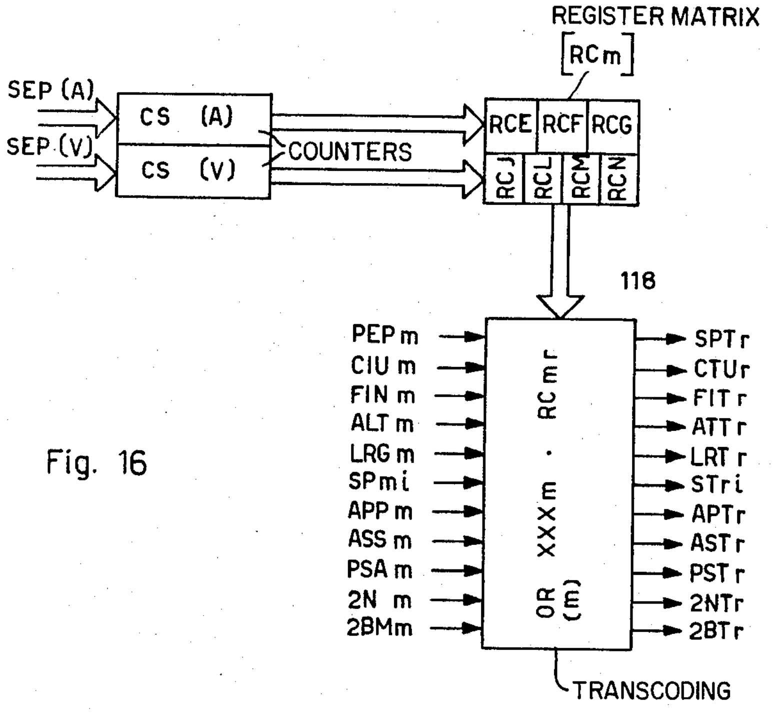
FIGS. 16 to 18 show details of the block diagram of FIG. 8.

A signal expressing a characteristic of a motif having the fixed name *m* will therefore be converted into a signal XXT*r* expressing the same characteristic for a motif having the transcoded name *r*. For each family of motifs (*m*) there is a counter CS(*m*), which counts the number of separations which have occurred within the framework of the family. Since the transcoding is effected solely on the families of the blanks and antiblanks, there will be two counters CS(V) and CS(A) relating, respectively, to the blank and antiblank motifs (FIG. 16). When a motif *m* of the family (*m*) is separated, the indication of CS(*m*) is stored in a corresponding register RCm of a matrix of registers [RC*m*]. Each register RC*m* indicates therefore the order number of separation of the motif *m* within its family. The transcoding is effected then on a group of signals, indicated generically by XXX*m*, by the logical circuit 118 which effects the following logical operation:

$$XXTr = \underset{(m)}{OR}\ XXXm \cdot RCmr$$

The signals on which there is effected the transcoding are indicated in FIG. 16; some of these have already been introduced, others will be introduced in the following description.

For each character the topographical relations between each pair of transcoded motifs *r* and *s* are stored in a series of flip-flop matrices NO*rs*, SD*rs*, ES*rs*, OV*rs*. In each of these matrices the state 1 of a flip-flop indicates, respectively, that the motif *r* is to the north of the motif *s*, that *r* is to the south of *s*, that *r* is to the east of *s*, that *r* is to the west of *s*. The relations of north and south are verified on separated motifs; the relations of east and west are verified on pairs of motifs in which the motif that is to be found to the east is finished.

Figure 17:
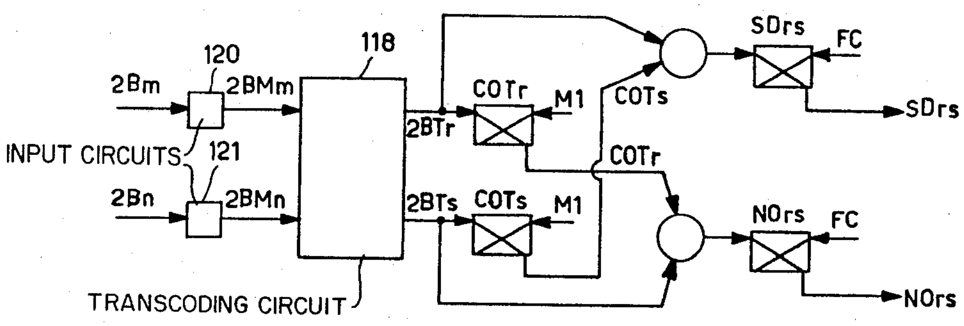

Each signal 2B*m*, 2B*n*, passes to the input of a corresponding circuit, 120, 121 respectively (FIG. 17) which supplies as output an impulse, 2BM*m*, 2BM*n* respectively, in correspondence with the falling edge of the signal 2Bm, 2Bn. The duration of the impulses 2BM*m*, 2BM*n* has to be less than one scanning point. The impulses 2BM*m*, 2BM*n* pass to the transcoding circuit 118, from which they emerge respectively as signals 2BT*r*, 2BT*s*. The signals 2BT*r*, 2BT*s* pass to the SET input of a corresponding flip-flop COT*r*, COT*s* which are put into RESET condition by the end-of-section signal M1. Therefore COT*r* starts with 2BT*r* and finishes at end of section. For the flip-flops N*ors* and SD*rs* there is therefore:

$$SET\ (NOrs) = COTr \cdot 2BTs$$

$$RES\ (NOrs) = FC$$

$$SET\ (SDrs) = COTs \cdot 2BTr$$

$$RES\ (SDrs) = FC$$

Figure 18:
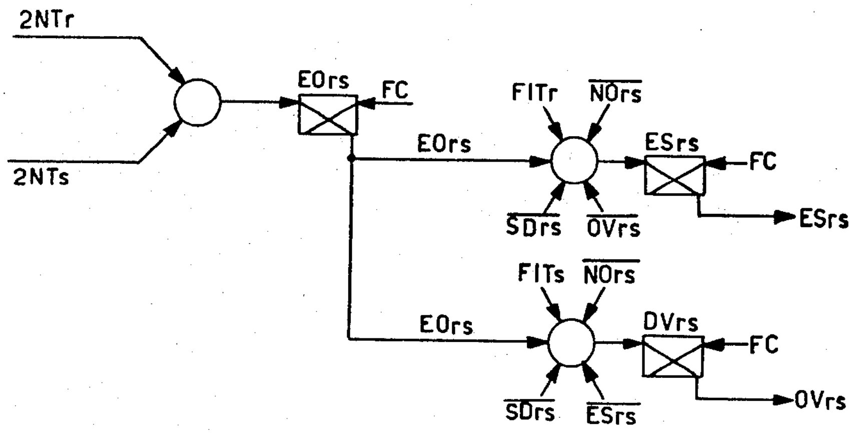

A group of flip-flops EO*rs* (FIG. 18) register the existence of a relation of the type east-west between the motifs *r* and *s* in the first section in which there is verified the belonging between the shadow of the motifs *r* and *s*. There is therefore:

$$SET\ (EOrs) = 2NTr \cdot 2NTs$$

$$RES\ (EOrs) = FC$$

For the flip-flops ESrs and OVrs there is then, respectively:

$$SET\ (ESrs) = FITr \cdot EOrs \cdot \overline{NOrs} \cdot \overline{SDrs} \cdot \overline{Ovrs}$$

$$RES\ (Esrs) = FC$$

$$SET\ (OVrs) = FITs \cdot EOrs \cdot \overline{Nors} \cdot \overline{SDrs} \cdot ESrs$$

$$RES\ (OVrs) = FC$$

Therefore there is established a relation of the type EAST (WEST) between the motifs *r* and *s* through which there is a relationship of the type east-west, the motif *r* (*s*) being finished. The conditions $\overline{NOrs}$, $\overline{SDrs}$, $\overline{ESrs}$, $\overline{OVrs}$ serve to prevent the establishment of a relationship of the type east or of the type west between two motifs for which there has already been established a relation of the type north-south or the opposite relation east-west.

The bits registered in the topological matrix 28 and the bits registered in the morphological and metric matrix 29, these latter transcoded by means of the circuit 30, are sent, at the end of the character, to the categorization circuit 31. This is a combinatory circuit based upon a group of suitable equations in the variables represented by the morphotopological and metric characteristics of the motifs, and having an output for each character of the set of characters recognisable by the apparatus, and an output corresponding to the case of non-recognition.

Figure 20:
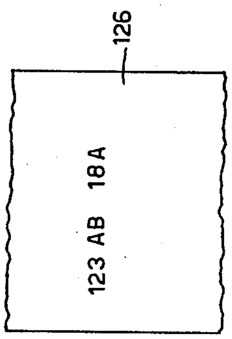

The categorization circuit 31 can be simplified if one knows a priori the format of the documents which bears the characters that are to be recognised, that is the distribution of the numbers and of the letters or of the special signs in each row of characters to be recognised. In the case in which the characters that are to be recognised are those printed on the roll 126 of an invoicing machine (FIGS. 19 and 20), in each line there is normally a constant number of zones of symbols and a fixed distribution of numbers and of special signs in each zone. The recognisation device can therefore be programmed for each roll that is to be examined so that the categorizer 31 is informed, for each symbol which presents itself, if the symbol will be a number or of a special sign. It is thus possible to eliminate the ambiguity, for example, between the number 8 and the letter B, avoiding complicating the logical equations of the categorizer 31.

Figure 19:
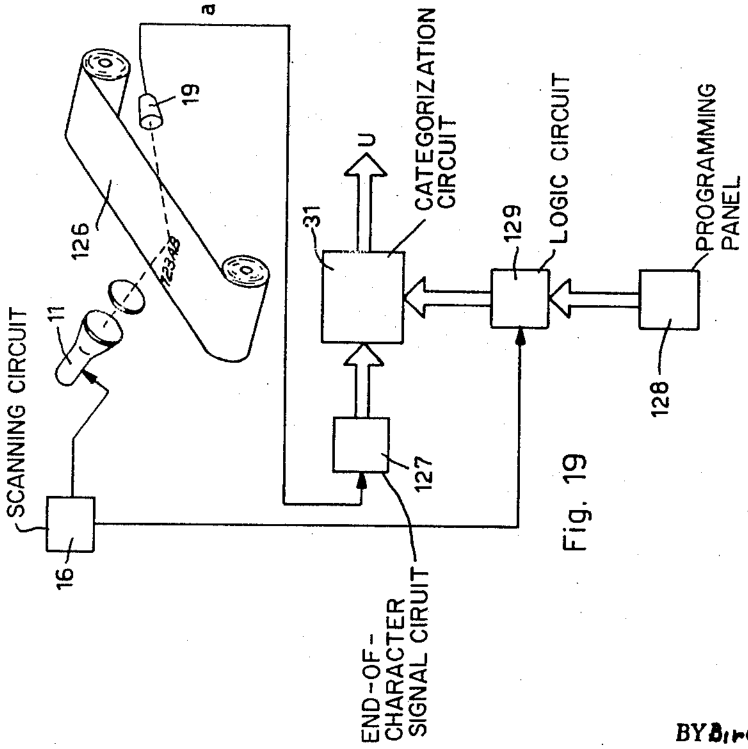

FIG. 19 is a simplified block diagram of a tally roll reader embodying the invention, in which a programming panel 128 which can be operated manually allows one to set up the format of a roll. A logical circuit 129 compares the information of the scanning circuit 16 relating to a new character which presents itself with the information registered in the programming panel and indicates to the categorizer 31 if the character which appears is a number or a special sign.

The recognition apparatus can also comprise logic for rescanning a character in the event of non-recognition. This can be effected in known manner; see for example quoted British Pat. application No. 61210/70.

To re-read a non-recognised character, it is necessary that the cathode ray tube 11, having arrived at the end of the character, returns to its start in order to re-effect the scanning. One could for example store each start of character and use the datum stored for the possible re-scanning; but this involves complications and lack of exactness. Preferably, therefore, when a non-recognition signal is obtained, the apparatus effects a scanning of the same character in the direction opposed to that of normal reading until an end-of-character signal is obtained, which will coincide with the start of the non-recognised character; at this point the cathode ray tube 11 returns to effect a rescanning in the normal way of reading.

Figure 21:
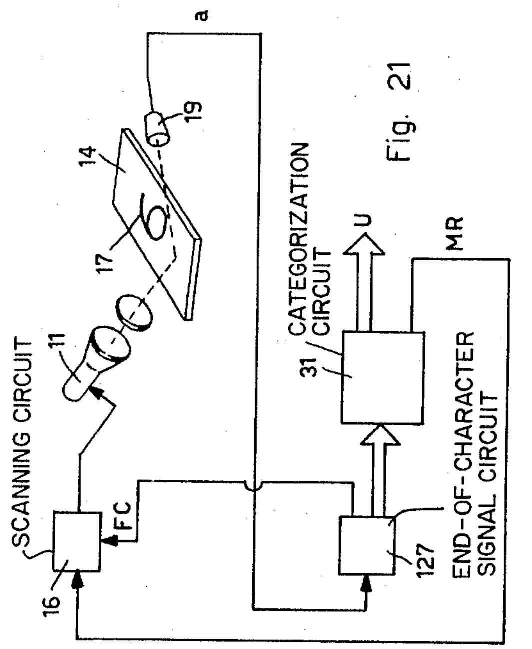
FIGS. 19 to 21 show modifications of the apparatus of FIG. 1.

FIG. 21 is a simplified block diagram of a recognition apparatus which applies this idea. The categorizer 31 supplies for a non-recognised character a signal MR which operates on the scanning circuit 16 in order to control a rescanning in the converse direction of the character. A circuit 127 supplies an end-of-character signal FC which causes the circuit 16 to revert to scanning on the normal reading direction of the character.

What we claim is:

1. Apparatus for recognizing graphic symbols, comprising means for exploring each symbol along a succession of substantially parallel sections to generate a signal representing for each section a succession of contrasting segments of first and second kinds, and logical circuit means for examining in each section, the relationship of each segment of the first kind to the segments of the second kind and to a shadow of the segments of the second kind encountered in the sections already examined, said shadow comprising a projection of said segments encountered in said previously examined sections of said character on a line parallel to the scanning direction, said logical circuit means comprising first register means for storing a signal indicating the duration of each such segment of the first kind and second register means for storing a signal defining the length of the projection defining said shadow of the segments of the second kind, means for assigning the signals representing the segments of the first kind to one of a plurality of register means for storing motifs of different types on the basis of the signals stored in said first and second registers, and categorizing means responsive to the combination of motifs present in the explored symbol and stored in said motif storage register means to categorize explored symbols as one of the symbols to be recognized.

2. Apparatus according to claim 1, comprising means for filling in short interruptions in the shadow of the segments of the second kind.

3. Apparatus according to claim 1, wherein the segments of the first and second kind are white and black respectively.

4. Apparatus according to claim 1, comprising means for detecting the last segment of the first kind in the section explored.

5. Apparatus according to claim 1 wherein said assigning means comprise, with respect to each motif, a plurality of registers, each of said registers storing the signals representing the segments of a particular motif of the corresponding type.

6. Apparatus according to claim 5, comprising means for associating with each one of said registers a code signifying the order of separation of the motif therein contained within a family of motifs.

7. Apparatus according to claim 1 wherein the logical circuits include means for verifying the presence of segments of the motif in a number of adjacent sections greater than a prefixed minimum, said segments being such that each pair of adjacent segments belong to each other for a number of points greater than a second prefixed minimum whereby the motif is determined to be separated.

8. Apparatus according to claim 7, wherein the logical circuits treat a motif as finished upon determination that it is closed, or that a successor to it exists, or that the character finishes.

9. Apparatus for recognizing graphic symbols, comprising means for exploring each symbol along a succession of substantially parallel sections to generate signals representing for each section a succession of contrasting segments of first and second kinds, a plurality of registers adapted to store the signals representing the segments of one of said first and second kinds as portions of principles of motifs encountered in each section, and a plurality of control means for storing the signals representing different ones of said principles in different ones of said plurality of registers unti the stored portion representing signals indicate that the corresponding principles have existed for a predetermined minimum number of sections said control means including means for associating with each of said registers a code signifying the order of separation of the motif contained therein within a family of motifs.

10. Apparatus as claimed in claim 9 wherein said control means includes means for transferring from said different principle storing registers to another register of said plurality of registers the signal representing ones of said principles stored over the predetermined minimum number of sections.

11. Apparatus according to claim 9, wherein the control means include means for emptying any of said different principle storing registers of its contents if no segments are stored in said any register for a number of sections greater than the predetermined minimum.

12. Apparatus as claimed in claim 11 wherein said control means includes means for transferring from said different principle storing registers to another register of said plurality of registers the signals representing ones of said principles stored over the predetermined minimum number of sections.

* * * * *